United States Patent
Carcano et al.

(10) Patent No.: US 11,586,921 B2
(45) Date of Patent: Feb. 21, 2023

(54) METHOD FOR FORECASTING HEALTH STATUS OF DISTRIBUTED NETWORKS BY ARTIFICIAL NEURAL NETWORKS

(71) Applicant: Nozomi Networks Sagl, Mendrisio (CH)

(72) Inventors: Andrea Carcano, Varese (IT); Moreno Carullo, Gavirate (IT)

(73) Assignee: Nozomi Networks Sagl, Mendrisio (CH)

( * ) Notice: Subject to any disclaimer, the term of this patent is extended or adjusted under 35 U.S.C. 154(b) by 326 days.

(21) Appl. No.: 16/915,326

(22) Filed: Jun. 29, 2020

(65) Prior Publication Data

US 2021/0406675 A1    Dec. 30, 2021

(51) Int. Cl.
*G06N 3/08* (2006.01)
*G06N 3/04* (2006.01)
*H04L 9/40* (2022.01)

(52) U.S. Cl.
CPC ......... *G06N 3/08* (2013.01); *G06N 3/04* (2013.01); *H04L 63/1433* (2013.01)

(58) Field of Classification Search
CPC ............ G06N 3/08; G06N 3/04; G06N 3/084; G06N 3/0445; G06N 3/0454; H04L 63/1433; H04L 69/22; G05B 23/02; G06F 11/3006; G06F 11/3447; G06Q 10/04; G06Q 10/0635
See application file for complete search history.

(56) References Cited

U.S. PATENT DOCUMENTS

| | | | |
|---|---|---|---|
| 2003/0115133 A1* | 6/2003 | Bian | G06Q 99/00 705/38 |
| 2007/0100712 A1* | 5/2007 | Kilpatrick | G06Q 10/06 705/29 |
| 2013/0191919 A1* | 7/2013 | Basavapatna | H04L 63/20 726/25 |
| 2016/0248794 A1* | 8/2016 | Cam | H04L 63/1433 |
| 2017/0357812 A1* | 12/2017 | Lerner | G06N 20/00 |
| 2018/0278486 A1* | 9/2018 | Mermoud | H04L 41/16 |
| 2018/0357559 A1* | 12/2018 | Truong | G06N 20/00 |
| 2019/0370716 A1* | 12/2019 | Kavumpurath | G06N 20/00 |

* cited by examiner

*Primary Examiner* — Beemnet W Dada
(74) *Attorney, Agent, or Firm* — Jason L DeFrancesco

(57) ABSTRACT

The present invention relates to a method for forecasting health status of a distributed network by an artificial neural network comprising the phase of identifying one or more sites, one or more assets of the sides and the links between the identified assets in said distributed network, comprising the phase of evaluating the actual health status of each of the identified assets, the phase of evaluating the actual health status of each of said identified sites and the phase of forecasting, by the artificial neural network, the subsequent health status of each of the identified sites according to a forecasting function based on a set of values comprising the actual asset health status rank, the actual asset infection risk, the actual asset infection factor, the actual site health status rank and the actual site infection risk.

10 Claims, No Drawings

METHOD FOR FORECASTING HEALTH STATUS OF DISTRIBUTED NETWORKS BY ARTIFICIAL NEURAL NETWORKS

FIELD OF INVENTION

The present invention relates to the field of security methods and security systems in the management of distributed networks, with specific reference to distributed networks. In particular, the present invention relates to a method for forecasting health status of distributed networks by the use of artificial neural networks.

BACKGROUND ART

A site represents a physical location where a certain amount of network-reachable assets is located.

An asset is a physical (or virtual, as for example a Virtual Machine) network-enabled equipment that is physically connected inside the network of a site. An asset can be a computer, a tablet, a printer, or any other kind of device able to communicate in a TCP/IP or a like network.

Moreover, an asset can communicate or have the possibility to communicate with other assets. In this case, they have a common link which models the fact that an asset can communicate with another asset over the network with some protocol. Computer networks can have several components in between assets and different equipment types (routers, firewalls, application firewalls, etc.) exist that can inhibit all or some protocols between two assets. For this reason, a link needs to have a "from" and a "to" asset, and a protocol.

Due to the nature of networking software, one or more vulnerabilities can affect the one or more assets and, as such, are commonly subject to attacks that undermine their security.

In the cyber security world, it is common to evaluate the security posture of a given asset or system in a static way, by looking at its current health, vulnerabilities, and security measures put in place to prevent various kinds of disruption.

A complex way of evaluating the vulnerability of a system is to evaluate the entire system, as well as each asset, with a scoring system of the CVSS type consisting of three metric groups: Base, Temporal, and Environmental. The Base group represents the intrinsic qualities of a vulnerability that are constant over time and across user environments, the Temporal group reflects the characteristics of a vulnerability that change over time, and the Environmental group represents the characteristics of a vulnerability that are unique to a user's environment. Summing up, the Base metric produces a score, which can then be modified by scoring the Temporal and Environmental metrics.

Anyway, analyzing such aspects in isolation and with a static approach can give a false perception of reality and can bring to incorrect conclusion.

It would therefore be desirable to have a method capable for forecasting health status of a site in a distributed network. Furthermore, it would be desirable to have a method capable to better predict how risk can impact the health status of the system by analyzing holistically the evolution of the system over time. Finally, it would be desirable to have a method capable preventing anomalous health statuses connected to changes in assets vulnerability.

Likewise, it would be desirable to have an apparatus capable to better predict how risk can impact the health status of the system by analyzing holistically the evolution of the system over time.

BRIEF DESCRIPTION OF THE INVENTION

The object of the present invention is to provide a method for forecasting health status of a distributed network by an artificial neural network capable of minimizing the aforementioned drawbacks.

According to the present invention is described, therefore, a method for forecasting health status of a distributed network by artificial neural network comprising the phase of identifying the objects in the distributed network comprising the steps of:
  identifying, by computerized data processing unit operatively connected to the distributed network, one or more sites in the distributed network;
  identifying, by the computerized data processing unit, one or more assets of each of the identified sites;
  identifying, by the computerized data processing unit, the links between the identified assets, wherein a link is defined by a data packet exchanged in the distributed network having a protocol field relating to the sender asset, a protocol field relating to the recipient asset and a protocol field which allows communication between the sender asset and the recipient asset, and wherein for each of the links the sender asset and the recipient asset define nodes and connections between the sender asset and the recipient asset define the link between the nodes with a direction from the sender asset to the recipient asset;
  storing, in a storage unit of the permanent type operatively connected to the data processing unit, the identified sites, the identified assets and the identified links for the distributed network;
wherein the method for forecasting health status further comprises the phase of evaluating, in an actual iteration, the actual health status of each of the identified assets comprising the steps of:
  evaluating, by the computerized data processing unit, the actual asset health status rank of each of the identified assets according to a predefined set of asset health status values ranging from the worst asset health status to the best asset health status;
  evaluating, by the computerized data processing unit, the actual asset infection risk of each of the identified assets according to a predefined set of asset infection risk values ranging from the maximum asset infection risk to no asset infection risk;
  calculating, by the artificial neural network operated by the computerized data processing unit, the actual asset infection factor of each of the identified assets as probability that an infection of the asset can spread to other assets according to the identified links;
wherein the method for forecasting health status further comprises the phase of evaluating, in an actual iteration, the actual health status of each of the identified sites comprising the steps of:
  evaluating, by the computerized data processing unit, the actual site health status rank of each of the identified sites as equal to the minimum actual asset health status value of the assets in the site;
  evaluating, by the computerized data processing unit, the actual site infection risk of each of the identified sites as equal to the maximum asset infection risk value of the assets in the site; and,
wherein the method for forecasting health status further comprises the phase of forecasting, in a subsequent iteration and by the artificial neural network operated by the computerized data processing unit, the subsequent health status of each of the identified sites, according to a forecasting function based on a set of forecasting values comprising the actual asset health status rank, the actual asset infection risk, the actual asset infection factor, the actual site health status rank and the actual site infection risk.

The method according to the present invention therefore allows to evaluate the actual site's network in term of risk and health status and to provide a forecast on how it will behave in the near future. By making use of an artificial neural network, it is possible to define a machine learning approach, wherein the forecast is based on the learning events in an actual state.

The phase of evaluating the actual health status of each of the identified assets and the phase of evaluating the actual health status of each of the identified sites are carried out for a predetermined learning time interval, wherein the actual asset health status rank of each of the identified assets, the actual asset infection risk of each of the identified assets, the actual asset infection factor of each of the identified assets, the actual site health status rank of each of the identified sites and the actual site infection risk of each of the identified sites are stored in the storage unit.

The predetermined learning time interval defines the scheduled time for computing the actual iteration, therefore the artificial neural network can be trained within said learning time interval.

The phase of evaluating the actual health status of each of the identified assets and the phase of evaluating the actual health status of each of the identified sites are carried out for a predetermined learning time interval, wherein the actual asset health status rank of each of the identified assets, the actual asset infection risk of each of the identified assets, the actual asset infection factor of each of the identified assets, the actual site health status rank of each of the identified sites and the actual site infection risk of each of the identified sites comprise a plurality of values defined at predetermined learning instants in the predetermined learning time interval.

In this way, changes to assets or sites are evaluated at predetermined instants.

The phase of evaluating the actual health status of each of the identified assets and the phase of evaluating the actual health status of each of the identified sites are carried out for a predetermined learning time interval, wherein the actual asset health status rank of each of the identified assets, the actual asset infection risk of each of the identified assets, the actual asset infection factor of each of the identified assets, the actual site health status rank of each of the identified sites and the actual site infection risk of each of the identified sites comprising a plurality of values defined upon changes during the predetermined learning time interval.

In this way, changes to assets or sites are evaluated at their occurrence.

The phase of forecasting the subsequent health status of each of the identified sites is carried out for a predetermined forecasting time interval.

The predetermined forecasting time interval defines the scheduled time for computing the next iteration, therefore the artificial neural network can forecast the health status within said forecasting time interval.

The phase of evaluating the actual health status of each of the identified assets and the phase of evaluating the actual health status of each of the identified sites are carried out for a predetermined learning time interval, wherein the phase of forecasting the subsequent health status of each of the identified sites is carried out for a predetermined forecasting time interval, and wherein the forecasting time interval is equal to the learning time interval.

Thus, the range of forecasting corresponds to the range of training.

The artificial neural network is of the feed-forward type trained with backpropagation.

In this way, the information moves in only one direction, forward, from the input nodes to the output nodes. There are no cycles or loops in the network. The output values are compared with the real value to compute the value of some predefined error-function. The error is then fed back through the network. Using this information, the algorithm adjusts the weights of each connection in order to reduce the value of the error function by some small amount.

The artificial neural network is a 3-hidden-layers network with at least as many neurons in the hidden layer as the number of the set of forecasting values, and wherein a different artificial neural network is used for each of the identified sites.

By defining such a number of layers and neurons it is possible to approximate every kind of site, which has its own artificial neural network.

The set of forecasting values also comprises an aging frequency value for each of the identified assets in the identified sites, wherein the aging frequency value for the next iteration is calculated, by the computerized data processing unit, for each of the assets by applying a predetermined decay factor to the actual asset infection factor in the actual iteration.

The aging frequency, therefore, allows to track frequency of entities and events over time and can be seen as the synapse of the artificial neural network The infection factor is calculated for each of the identified assets, by the artificial neural network operated by the computerized data processing unit, as the maximum value between the actual asset vulnerability factor of the assets, being the probability that a vulnerability affects the asset, and the actual asset spread factor of the asset, being the probability that a further asset attack the identified asset according to the identified links.

DETAILED DESCRIPTION OF THE INVENTION

The present invention relates to a method for forecasting health status of a distributed network by artificial neural network.

The method according to the present invention find useful application in physical or virtual infrastructures or automation systems, in particular in industrial automation systems, such as industrial processes for manufacturing production, industrial processes for power generation, infrastructures for distribution of fluids (water, oil and gas), infrastructures for the generation and/or transmission of electric power, infrastructures for transport management.

The term "site" means, in the present invention, a physical location where a certain amount of network-reachable assets is located.

The term "asset" means, in the present invention, a physical or virtual network-enabled equipment that is physically connected inside the network of a site. An asset can be a computer, a tablet, a printer, or any other kind of device able to communicate in a TCP/IP or a like network.

The term "link" means, in the present invention, a model which represents a communication between two assets over the network with some protocol. An asset can communicate or have the possibility to communicate with other assets. If an asset can communicate with another asset, they have a common link, as above described. Computer networks can have several components in between assets and different equipment types (routers, firewalls, application firewalls, etc.) exist that can inhibit all or some protocols between two assets. For these reasons, a link needs to have a "from" and a "to" asset, and a protocol because it is not guaranteed that if an $asset_a$ can connect to an $asset_b$ with a protocol, the same can happen for said $asset_b$ to said $asset_a$. Representing a link is, also, useful because it is possible to create a reachability graph of an asset, that in turn can be used to understand how infections can spread over the network.

The distributed network may therefore connect a plurality of sites which, in turn, could be provided with one or more assets. The latter could create a network of interconnections through links, as well described above.

The method according to the present invention allows to identify the aforementioned elements to forecast the health status of the distributed network through a plurality of phases and by making use of a forecasting function implemented by the artificial neural network. In particular, scope of the present invention is to forecast the health status of the distributed network over two subsequent iterations, i.e. the actual iteration and the subsequent iteration.

The term "actual iteration" means, in the present invention, an iteration which is still running and to be used in the learning phase of the artificial neural network. In this regard, the term "learning time interval" means, in the present invention, a time interval according to the learning phase for the artificial neural network.

The term "subsequent iteration" means, in the present invention, an iteration which is still not running and to be used in the forecasting phase of the artificial neural network. In this regard, the term "forecasting time interval" means, in the present invention, a time interval according to the forecasting phase for the artificial neural network.

Due to the nature of networking software, one or more vulnerabilities can affect the Asset.

The term "vulnerability" means, in the present invention, a potential security problem that a given hardware or software product (or combination thereof) can have at a given version(s). A given vulnerability can be exploited in several different manners, and one of those is via network with one or more protocols where these protocols are used to infect the asset in the first place or to spread the infection to more assets (the protocols for the first and latter can be different). It is important to note that this representation contemplates the existence of vulnerabilities that can be exploited in other ways (e.g. delivery of a malware via USB key) but in that case the protocol set will be empty.

The term "infection" means, in the present invention, the occurrence of some malware inside a network, and particularly affecting one (or more) assets, usually due to some form of vulnerability. Another property of an infection is the infection factor (I-Factor), expressed in term of probability P that the infection can spread to another asset given that it is also affected by the same vulnerability.

The method according to the present invention allows to evaluate the actual site's network in term of risk and health status and to provide a forecast on how it will behave in the near future. By making use of an artificial neural network, it is possible to define a machine learning approach, wherein the forecast is based on the learning events in an actual state, as herewith described.

The method for forecasting health status of a distributed network by artificial neural network comprising according to the present invention comprises three main phases, in particular a phase of identifying the objects in the distributed network, a subsequent phase of evaluating, in an actual iteration, the actual health status of each of the identified assets, a subsequent phase of evaluating, in an actual iteration, the actual health status of each of the identified sites and, finally, a phase of forecasting, in a subsequent iteration and by the artificial neural network, the subsequent health status of each of the identified sites.

The method is preferably carried out by making use of one or more computerized data processing unit and, in particular, the artificial neural network is operated by one or more of said computerized data processing unit.

The phase of identifying the objects in the distributed network comprises a first step of identifying, by the computerized data processing unit operatively connected to the distributed network, one or more sites in the distributed network, and then a second step of identifying, by the computerized data processing unit, one or more assets of each of the identified sites.

Therefore, the distributed network may comprise one or more sites which, in turn, may comprise one or more assets.

The phase of identifying the objects in the distributed network comprises a further step of identifying, by the computerized data processing unit, the links between the identified assets, wherein a link is defined by a data packet exchanged in the distributed network having a protocol field relating to the sender asset, a protocol field relating to the recipient asset and a protocol field which allows communication between the sender asset and the recipient asset, and wherein for each of the links the sender asset and the recipient asset define nodes and connections between the sender asset and the recipient asset define the link between the nodes with a direction from the sender asset to the recipient asset.

Finally, a further step of storing, in a storage unit of the permanent type operatively connected to the data processing unit, the identified sites, the identified assets and the identified links for the distributed network is carried out.

Therefore, the aforementioned phase of identifying the objects in the distributed network allows to define the entire structure of the distributed network to be forecasted, taking into account the all connections between the objects. In particular, these are the main entities and data structures. In a computer network these entities evolve over time according to several kind of events, that consequently change the status of one or more involved entity.

The cyber security bulletin of a site comprises two distinct values, which are its health status rank and its infection risk. As described for the site, the asset itself also has a cyber security bulletin comprising the health status rank and the infection risk that express the same concepts but focused on a specific asset. In the following the main events that affect the evolution of the cyber security posture are described, according to the aforementioned values.

The term "health status rank" means, in the present invention, a codified value about the health status of an object, i.e. a site or an asset. Preferably, the health status rank is a number selected in a predefined range which allows to express a codified value of health from a worst value to a best value. In particular, in the present invention the health status rank is a decimal number ranging between the number 0 and the number 10, wherein the number 0 expresses a very bad (worst) health status and the number 10 expresses a good (best) health status. A bad health status means that some infection (usually a malware) is active in the site on one or more assets or some other form of functionality degradation is occurring due to cyber security issues.

The health status rank evaluated for an asset is, therefore expressed as asset health status rank, while the same for a site is, consequently expressed as site health status rank. Moreover, taking into account the kind of iteration, as above described, the health status rank of an asset could be evaluated in an actual iteration, as actual asset health status rank or actual health asset of an asset, and in a subsequent iteration, as subsequent asset health status rank or subsequent health asset of an asset. The same applies, mutatis mutandis, for a site taking into account the actual iteration, as actual site health status rank or actual health asset of a site, and in a subsequent iteration, as subsequent site health status rank or subsequent health asset of a site.

The term "infection risk" means, in the present invention, a codified value about the risk of an object to get infected, i.e. a site or an asset. Preferably, the infection risk is a number selected in a predefined range which allows to express a codified value of the infection risk from a maximum value to a minimum value. In particular, in the present invention the infection risk is a decimal number ranging between the number 0 and the number 10, wherein the number 0 express no risk of get infected (best) and the number 10 express close to certainty of getting infected (worst).

In the extent to evaluate the aforementioned values, the method according to the present invention comprises the phase of evaluating, in an actual iteration, the actual health status of each of the identified assets. In particular, such a phase comprises a step of evaluating, by the computerized data processing unit, the actual asset health status rank of each of the identified assets according to a predefined set of asset health status values ranging from the worst asset health status to the best asset health status. A further step of evaluating, by the computerized data processing unit, the actual asset infection risk of each of the identified assets according to a predefined set of asset infection risk values ranging from the maximum asset infection risk to no asset infection risk is carried out. Finally, a step of calculating, by the artificial neural network operated by the computerized data processing unit, the actual asset infection factor of each of the identified assets as probability that an infection of the asset can spread to other assets according to the identified links is carried out.

Taking into account the values evaluated or calculated for each asset of a site, the method according to the present invention comprises the phase of evaluating, in an actual iteration, the actual health status of each of the identified sites. In particular, such a phase comprises a first step of evaluating, by the computerized data processing unit, the actual site health status rank of each of the identified sites as equal to the minimum actual asset health status value of the assets in the site and a second step of evaluating, by the computerized data processing unit, the actual site infection risk of each of the identified sites as equal to the maximum asset infection risk value of the assets in the site.

A high infection risk can bring the health status rank to increase in short period of time, while a site with low infection risk will likely have a good health status rank.

On the basis of the aforementioned ranges, when an infection is affecting an asset, the correspondent health status rank is diminished by the health impact value of the infection, a decimal number between the number 0 and the number 10, wherein the number 10 expresses the maximum disruption to an asset health status rank. The health impact is derived from the vulnerabilities used to infect, by considering the maximum health impact of them.

The term "vulnerability" means, in the present invention, the inability of an object to withstand the effects of a hostile environment. A vulnerability is characterized by the set of conditions (e.g. software version) that need to exist on the asset in order to be available a risk factor.

The aforementioned phases, i.e. the phase of evaluating the actual health status of each of the identified assets and the phase of evaluating the actual health status of each of the identified sites, allows the training (or learning phase) of the artificial neural network design to carried out the method, as below described in greater details. The artificial neural networks (ANN) are computing systems inspired by the biological neural networks. Such systems learn to perform tasks by considering examples, generally without being programmed with task-specific rules. An ANN is based on a collection of connected units or nodes called artificial neurons (or simply neurons), which loosely model the neurons in a biological brain. Each connection, like the synapses in a biological brain, can transmit a signal to other neurons. An artificial neuron that receives a signal then processes it and can signal neurons connected to it. Typically, neurons are aggregated into layers. Different layers may perform different transformations on their inputs. Signals travel from the first layer (the input layer), to the last layer (the output layer), possibly after traversing the layers multiple times.

In an embodiment, the artificial neural network of the present invention is of the feed-forward type trained with backpropagation.

A feed-forward neural network is an artificial neural network wherein connections between the nodes do not form a cycle, wherein the information moves in only one direction, forward, from the input nodes, through the hidden nodes (if any) and to the output nodes. There are no cycles or loops in the network. The output values are compared with the real value to compute the value of some predefined error-function. The error is then fed back through the network. Using this information, the algorithm adjusts the weights of each connection in order to reduce the value of the error function by some small amount.

In an embodiment, the artificial neural network is a 3-hidden-layers network with at least as many neurons in the hidden layer as the number of the set of forecasting values. In particular, the number or sites to be evaluated defines the number of artificial neural networks to be used, wherein a different artificial neural network is used for each of the identified sites.

By defining such a number of layers and neurons it is possible to approximate every kind of site, which has its own artificial neural network.

In the ANN multi-layer which makes use of backpropagation the output values are compared with the correct answer to compute the value of some predefined error-function. By various techniques, the error is then fed back through the network. Using this information, the algorithm adjusts the weights of each connection in order to reduce the value of the error function by some small amount. After repeating this process for a sufficiently large number of training cycles, the network will usually converge to some state where the error of the calculations is small, so that the ANN has learned a certain target function.

In an embodiment, the phase of evaluating the actual health status of each of the identified assets and the phase of evaluating the actual health status of each of the identified sites are carried out for a predetermined learning time interval, wherein the actual asset health status rank of each of the identified assets, the actual asset infection risk of each of the identified assets, the actual asset infection factor of each of the identified assets, the actual site health status rank of each of the identified sites and the actual site infection risk of each of the identified sites are stored in the storage unit.

The predetermined learning time interval defines the scheduled time for computing the actual iteration, therefore the artificial neural network can be trained within said learning time interval.

In particular, the phase of evaluating the actual health status of each of the identified assets and the phase of evaluating the actual health status of each of the identified sites are carried out for a predetermined learning time interval, wherein the actual asset health status rank of each of the identified assets, the actual asset infection risk of each of the identified assets, the actual asset infection factor of each of the identified assets, the actual site health status rank of each of the identified sites and the actual site infection risk of each of the identified sites comprise a plurality of values defined at predetermined learning instants in the predetermined learning time interval.

In this way, changes to assets or sites are evaluated at predetermined instants.

Alternatively to, or in combination with, the aforementioned features, the phase of evaluating the actual health status of each of the identified assets and the phase of evaluating the actual health status of each of the identified sites are carried out for a predetermined learning time interval, wherein the actual asset health status rank of each of the identified assets, the actual asset infection risk of each of the identified assets, the actual asset infection factor of each of the identified assets, the actual site health status rank of each of the identified sites and the actual site infection risk of each of the identified sites comprising a plurality of values defined upon changes during the predetermined learning time interval.

In this way, changes to assets or sites are evaluated at their occurrence.

In an embodiment, the set of forecasting values also comprises an aging frequency value for each of the identified assets in the identified sites, wherein the aging frequency value for the next iteration is calculated, by the computerized data processing unit, for each of the assets by applying a predetermined decay factor to the actual asset infection factor in the actual iteration.

The aging frequency, therefore, allows to track frequency of entities and events over time and can be seen as the synapse of the artificial neural network Aging frequency allows to track frequency of entities and events over time, can be seen as the synapse of an artificial neural network. In fact, this data structure is the basis of the learning and prediction algorithm that allow to understand the current and future behavior of the system. Aging frequency can be used to track the frequency of a single object, or to compute a correlation matrix. In both situations, the main idea is that this data structure represents the knowledge of a given event, whose importance is decreased over time. For example, when tracking the probability of an asset to infect another asset, we can represent it as matrix AgingFrequencyProbabilityOfContagion($Asset_i$,$Asset_j$) whose value can be initialized with a certain amount of—let's say, 0.5. When iterating to the next cycle of the aging frequency, each value of the matrix is updated with a decay factor that decrease all probabilities by the value of the decay factor. In case of a decay factor of 0.01, at each iteration the AgingFrequencyProbabilityOfContagion($Asset_i$,$Asset_j$) is adjusted and so in case the previous iteration was 0.5 the new value would be 0.49. Different aging frequency structures (to track different objects) can use different decay factors.

Subsequently to the learning phase, the method for forecasting health status further comprises the phase of forecasting, in a subsequent iteration and by the artificial neural network operated by the computerized data processing unit, the subsequent health status of each of the identified sites, according to a forecasting function based on a set of forecasting values comprising the actual asset health status rank, the actual asset infection risk, the actual asset infection factor, the actual site health status rank and the actual site infection risk.

Preferably, the infection factor is calculated for each of the identified assets, by the artificial neural network operated by the computerized data processing unit, as the maximum value between the actual asset vulnerability factor of the assets, being the probability that a vulnerability affects the asset, and the actual asset spread factor of the asset, being the probability that a further asset attack the identified asset according to the identified links.

Therefore, the forecasting function uses a machine learning approach, preferably with a Feed-Forward Artificial Neural Network (ANN) trained with Backpropagation, that is used to build a model to understand the relation between all the considered factors (between them and over time), for each asset.

Taking into account some events to be evaluated, an event could be defined by a "connection", which occurs whenever an asset communicates with another asset, with a given protocol and application. When this event occurs, a link is either created or updated accordingly.

A further event is could be defined by an "attack", which may occur at given time on a target asset by an attacker asset, or an external attacker, causing a new infection to be created. The attack uses one or more vulnerabilities. When an infection is created, these updates are triggered in the method:

health status rank of the infected asset is updated;
aging frequency(es) are updated
Aging Frequency$_{ProbabilityOfBeingExploited(Vulnerability)}$=1
the probability that an asset with the given vulnerability can be affected by it, is being increased;
AgingFrequency$_{Asset(ProbabilityOfBeingAttacked)}$=1
the probability that an asset to be attacked is high.

Furthermore, the event "software change" may occur when a new software is installed in the system, either a completely new one or an update for an already installed one. Sometime the update of a software is referred as "patching". A patch, or a series of patches, can be due to the willingness to remove an infection from an asset. When a software is being installed or upgraded, an asset may have some vulnerabilities resolved, or new ones can appear. The risk factor of an Asset is updated: its risk is computed by finding the maximum value of risk in the vulnerabilities that affect it. If the software change event is removing an infection, these updates are also performed:

health status rank of the infected asset is updated as described;
aging frequency(es) are updated:
AgingFrequency$_{ProbabilityOfBeingExploited(Vulnerability)}$=0
If this event is not leaving a single asset being vulnerable to the given vulnerability;
AgingFrequency$_{ProbabilityOfBeingExploited(Asset)}$=0 if this event is fixing all the vulnerabilities that exist for the Asset.

Finally, the event "contagion" may occur when an infected asset spread its infection to another asset. The event is similar to an attack, but it is tracked differently in order to be able to better predict future evolutions of the system. Several updates are triggered in the method, similarly but differently to an attack:

health status rank of the infected asset is updated as described;
aging frequency(es) are updated:
AgingFrequency$_{ProbabilityOfBeingExploited(Vulnerability)}$=1
the probability that an asset with the given vulnerability can be affected by it, is being increased.
AgingFrequency$_{ProbabilityOfContagion(AssetX, AssetY)}$=1
the probability that asset$_X$ can infect assets is increased
AgingFrequency$_{Asset(ProbabilityOfBeingAttacked)}$=1
the probability that an asset to be attacked is high.

The approach of the present invention allows to calculate the health status rank and infection risk of a site (based on the same computations for the corresponding assets), and the computation of these two values over time allows to track and predict the cyber security posture of complex, geographically distributed and interconnected networks.

The idea of the method is that an ideal, starting situation at time 0 (first iteration) when everything is installed from scratch in the site and has new and secure software, it has a perfect situation where all assets have infection risk at a value equal to 0 and health status rank at a value equal to 10.

Starting from the second iteration, this initial and ideal situation is quickly deteriorated by assets that get infected by some external actor: these events are driven by the existence and evolution of vulnerabilities and how large is the attack surface of those e.g. if any defense measure is in place to prevent them.

Starting from the second iteration assets can get contaminated by other infected assets. This stream is mainly driven by the I-Factor of the ongoing infections and the measures that can be in place to prevent the spread of the infection. Of course, in the second iteration and onwards also the external actor infection stream stays active.

In an embodiment, the phase of forecasting the subsequent health status of each of the identified sites is carried out for a predetermined forecasting time interval. In particular, the predetermined forecasting time interval defines the scheduled time for computing the next iteration, therefore the artificial neural network can forecast the health status within said forecasting time interval.

Preferably, the phase of evaluating the actual health status of each of the identified assets and the phase of evaluating the actual health status of each of the identified sites are carried out for a predetermined learning time interval, wherein the phase of forecasting the subsequent health status of each of the identified sites is carried out for a predetermined forecasting time interval, and wherein the forecasting time interval is equal to the learning time interval. Thus, the range of forecasting corresponds to the range of training.

The forecasting function tries to understand what happens in the subsequent iteration, happening after a predetermined forecasting time interval. The forecasting time interval for the function can be set for example to 24 hours—the method will attempt to predict the status of the system in the next 24 hours, assuming that all entities and data structures are updated to the current state. It is important to note that if the forecasting time interval needs to be changed, the entire learning needs to be started from scratch.

As already described, the forecasting function uses a machine learning approach with a feed-forward artificial neural network trained with backpropagation, that is used to build a model to understand the relation between all the considered factors (between them and over time), for each asset, which is:

$$f_{Asset\_a}(x)=y$$

wherein "x" is called a pattern of the given set of features for the asset and "y" is the estimated new health status rank.

Preferably, the "x" vector is a pattern of features, as herewith described:
current health status rank of the asset$_a$;
AgingFrequency$_{ProbabilityOfBeingExploited(Asset\_a)}$ for the Asset;
highest "n" values of AgingFrequency$_{ProbabilityOfBeingExploited(Vulnerability)}$ affecting the asset$_a$;
highest "n" values of AgingFrequency$_{ProbabilityOfContagion(Asset\_b, Asset\_a)}$ where asset$_b$ are the neighbors of asset$_a$ with a link to it;
highest "n" values of the I-Factor active infections on asset$_b$, whereins asset$_b$ are the neighbors of asset$_a$ with a link to it.

The artificial neural network to estimate f$_{Asset\_a}$ is a 3-hidden-layers network with at least as many neurons in the hidden layer at the number of features, that is 3*n+2.

The method is trained in this way. At any given time, for asset$_a$, we have that X$_a$ has the most recent "m" entries, to allow the method to evolve over time and not be biased to past behavior.

In the first iterations (actual), patterns are recorded observing the behavior. The method adds to the available patterns X$_a$ the pairs (x, y) computing the features for "x" considering the previous health status rank and taking "y" as the current health status rank.

When at least "z" iterations have been done (learning phase), with "z" being a parameter being set during the learning phase, the method starts to predict the behavior. For each asset$_a$ it trains itself to estimate f$_{Asset\_a}$ splitting taking a random ⅔ of X$_a$ and using the remainder ⅓ to validate its performance using some form of metric like overall accuracy, not described in detail. If the overall prediction accuracy is above a predetermined number, i.e. 0.9—that means the prediction error has been less than 10% on the test set—the predicted value of the health status rank for the asset is f$_{Asset\_a}$(X)=y. In any case, at each iteration the real observed value for (x,y) is added to X$_a$ to improve future forecasting in further iterations.

For each aging frequency table, for each entry, the decay factor is applied for next iteration.

The steps above allow to predict the subsequent health status rank for each asset. The subsequent health status rank of the site is equal to the minimum predicted health status rank of the asset it is composed of.

The approach above allows to have a complete, unsupervised operation of the algorithm. In case a more complex assets-to-site combination function is desired, for example to give less weight to mostly isolated Assets, some more steps are required and a human expert is required to provide knowledge to the system to understand the desired aggregation policy.

The method according to the present invention allows, therefore, to compute an automatic bulletin on the status of a site's network in term of risk and current health status and to provide a forecast on how it will behave in the near future.

The invention claimed is:

1. A method for forecasting health status of a distributed network by artificial neural network comprising the phase of identifying the objects in said distributed network comprising the steps of:
   identifying, by computerized data processing unit operatively connected to said distributed network, one or more sites in said distributed network;
   identifying, by said computerized data processing unit, one or more assets of each of said identified sites;
   identifying, by said computerized data processing unit, links between said identified assets, wherein a link is defined by a data packet exchanged in said distributed network having a protocol field relating to a sender asset, a protocol field relating to a recipient asset and a protocol field which allows communication between said sender asset and said recipient asset, and wherein for each of said links said sender asset and said recipient asset define nodes and connections between said sender asset and said recipient asset define said link between said nodes with a direction from said sender asset to said recipient asset;
   storing, in a storage unit of the permanent type operatively connected to said data processing unit, said identified sites, said identified assets and said identified links for said distributed network;
wherein said method for forecasting health status further comprises the phase of evaluating, in an actual iteration, an actual health status of each of said identified assets comprising the steps of:
   evaluating, by said computerized data processing unit, an actual asset health status rank of each of said identified assets according to a predefined set of asset health status values ranging from the worst asset health status to the best asset health status;
   evaluating, by said computerized data processing unit, an actual asset infection risk of each of said identified assets according to a predefined set of asset infection risk values ranging from a maximum asset infection risk to no asset infection risk;
   calculating, by said artificial neural network operated by said computerized data processing unit, the actual asset infection factor of each of said identified assets as probability that an infection of said asset can spread to other assets according to said identified links;
wherein said method for forecasting health status further comprises a phase of evaluating, in said actual iteration, the actual health status of each of said identified sites comprising the steps of:
   evaluating, by said computerized data processing unit, the actual site health status rank of each of said identified sites as equal to the minimum actual asset health status value of said assets in said site;
   evaluating, by said computerized data processing unit, the actual site infection risk of each of said identified sites as equal to the maximum asset infection risk value of said assets in said site; and
wherein said method for forecasting health status further comprises the phase of forecasting, by said artificial neural network operated by said computerized data processing unit, a subsequent health status of each of said identified sites in a subsequent iteration, according to a forecasting function based on a set of forecasting values comprising said actual asset health status rank, said actual asset infection risk, said actual asset infection factor, said actual site health status rank and said actual site infection risk.

2. The method for forecasting health status of a distributed network by artificial neural network according to claim 1, wherein said phase of evaluating the actual health status of each of said identified assets and said phase of evaluating the actual health status of each of said identified sites are carried out for a predetermined learning time interval, and
   wherein said actual asset health status rank of each of said identified assets, said actual asset infection risk of each of said identified assets, said actual asset infection factor of each of said identified assets, said actual site health status rank of each of said identified sites and said actual site infection risk of each of said identified sites are stored in said storage unit.

3. The method for forecasting health status of a distributed network by artificial neural network according to claim 1, wherein said phase of evaluating the actual health status of each of said identified assets and said phase of evaluating the actual health status of each of said identified sites are carried out for a predetermined learning time interval, and
   wherein said actual asset health status rank of each of said identified assets, said actual asset infection risk of each of said identified assets, said actual asset infection factor of each of said identified assets, said actual site health status rank of each of said identified sites and said actual site infection risk of each of said identified sites comprise a plurality of values defined at predetermined learning instants in said predetermined learning time interval.

4. The method for forecasting health status of a distributed network by artificial neural network according to claim 1, wherein said phase of evaluating the actual health status of each of said identified assets and said phase of evaluating the actual health status of each of said identified sites are carried out for a predetermined learning time interval, and
   wherein said actual asset health status rank of each of said identified assets, said actual asset infection risk of each of said identified assets, said actual asset infection factor of each of said identified assets, said actual site health status rank of each of said identified sites and said actual site infection risk of each of said identified sites comprising a plurality of values defined upon changes during said predetermined learning time interval.

5. The method for forecasting health status of a distributed network by artificial neural network according to claim 1, wherein said phase of forecasting the subsequent health status of each of said identified sites is carried out for a predetermined forecasting time interval.

6. The method for forecasting health status of a distributed network by artificial neural network according to claim 1, wherein said phase of evaluating the actual health status of each of said identified assets and said phase of evaluating the actual health status of each of said identified sites are carried out for a predetermined learning time interval, wherein said phase of forecasting the subsequent health status of each of said identified sites is carried out for a predetermined forecasting time interval, and
   wherein said forecasting time interval is equal to learning time interval.

7. The method for forecasting health status of a distributed network by artificial neural network according to claim 1, wherein said artificial neural network is of the feed-forward type trained with backpropagation.

8. The method for forecasting health status of a distributed network by artificial neural network according to claim 1, wherein said artificial neural network is a 3-hidden-layers network with at least as many neurons in said hidden layer as the number of said set of forecasting values, and wherein a different artificial neural network is used for each of said identified sites.

9. The method for forecasting health status of a distributed network by artificial neural network according to claim 1, wherein said set of forecasting values also comprises an aging frequency value for each of said identified assets in said identified sites, wherein said aging frequency value for said next iteration is calculated, by said computerized data processing unit, for each of said assets by applying a predetermined decay factor to said actual asset infection factor in said actual iteration.

10. The method for forecasting health status of a distributed network by artificial neural network according to claim 1, wherein said infection factor is calculated for each of said identified assets, by said artificial neural network operated by said computerized data processing unit, as the maximum value between the actual asset vulnerability factor of said assets, being the probability that a vulnerability affects said asset, and the actual asset spread factor of said asset, being the probability that a further asset attack said identified asset according to said identified links.

* * * * *